(12) United States Patent
Sakamoto

(10) Patent No.: US 11,066,080 B2
(45) Date of Patent: Jul. 20, 2021

(54) VEHICLE CONTROL DEVICE AND ELECTRONIC CONTROL SYSTEM

(71) Applicant: Hitachi Automotive Systems, Ltd., Hitachinaka (JP)

(72) Inventor: Hideyuki Sakamoto, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/763,639

(22) PCT Filed: Dec. 4, 2018

(86) PCT No.: PCT/JP2018/044485
§ 371 (c)(1),
(2) Date: May 13, 2020

(87) PCT Pub. No.: WO2019/131003
PCT Pub. Date: Jul. 4, 2019

(65) Prior Publication Data
US 2020/0361478 A1    Nov. 19, 2020

(30) Foreign Application Priority Data

Dec. 25, 2017 (JP) .............................. JP2017-248464

(51) Int. Cl.
*B60W 50/00* (2006.01)
*B60W 50/02* (2012.01)
*B60R 16/023* (2006.01)

(52) U.S. Cl.
CPC ..... *B60W 50/0205* (2013.01); *B60R 16/0231* (2013.01); *B60W 50/0225* (2013.01); *B60W 2050/021* (2013.01)

(58) Field of Classification Search
CPC . B25J 9/0081; B25J 13/06; B25J 9/161; B25J 9/1664; G05B 19/427; G05B 2219/40519
See application file for complete search history.

(56) References Cited

U.S. PATENT DOCUMENTS

| | | | |
|---|---|---|---|
| 10,144,613 B2 * | 12/2018 | Mochizuki | ................ B66B 1/36 |
| 2007/0211622 A1 | 9/2007 | Yamakawa | |
| 2015/0344039 A1 | 12/2015 | Amoh | |

FOREIGN PATENT DOCUMENTS

| | | | |
|---|---|---|---|
| JP | 2003-115847 A | 4/2003 | |
| JP | 2007-235537 A | 9/2007 | |

(Continued)

OTHER PUBLICATIONS

International Search Report with English translation and Written Opinion issued in corresponding application No. PCT/JP2018/044485 dated Mar. 26, 2019.

*Primary Examiner* — Ian Jen
(74) *Attorney, Agent, or Firm* — Foley & Lardner LLP

(57) ABSTRACT

Implemented is a highly reliable vehicle control device capable of performing control transition safely to a degeneration control microcomputer even if an operation abnormality occurs in a control microcomputer in a vehicle control device.

Provided are: a control microcomputer 11b that outputs a control command to an actuator control device; and a degeneration control microcomputer 12b for control transition when an abnormality is detected in the control microcomputer 111b. When transitioning to the degeneration control microcomputer 12b when detecting the abnormality in the control microcomputer 11b, the control microcomputer 12b is notified of the abnormality of the control microcomputer 11b, and the control microcomputer 11b is reset after the required transition period of the degeneration control microcomputer 12b has elapsed and the degeneration control has started. As a result, a control blank period is eliminated.

11 Claims, 5 Drawing Sheets

(56) References Cited

FOREIGN PATENT DOCUMENTS

| JP | 2008-293420 A | 12/2008 |
|---|---|---|
| JP | 2015-93498 A | 5/2015 |
| JP | 6189004 B1 | 8/2017 |

* cited by examiner

VEHICLE CONTROL DEVICE AND ELECTRONIC CONTROL SYSTEM

TECHNICAL FIELD

The present invention relates to a vehicle control device and an electronic control system of an automatic driving system.

BACKGROUND ART

For an advanced automatic driving system, it is required for an electronic control unit (ECU), which is a superordinate control device that controls automatic driving, to continue the operation for a certain period until a driving operation is handed over to a driver, for example, even when a failure occurs in an arithmetic processing unit (microcomputer) that performs computation for automatic driving control.

PTL 1 discloses a vehicle control device that restricts a part of control functions of a plurality of sub-control units when a microcomputer of a main control unit operates normally but a supply voltage of the microcomputer falls outside a proper range.

CITATION LIST

Patent Literature

PTL 1: JP 2015-93498 A

SUMMARY OF INVENTION

Technical Problem

For example, an automatic driving system is constituted by a vehicle control device that outputs control commands and a plurality of actuator control devices that respectively perform engine control, brake control, power steering control, and the like based on the control commands from the vehicle control device.

Here, in the automatic driving system, it is desirable to monitor an operation of a microcomputer by a diagnostic circuit, for example, a watchdog timer monitoring program runaway in the microcomputer or the like and perform fail processing by detecting an abnormality of the microcomputer for the sake of functional safety. However, when processing such as stopping (resetting) the microcomputer is performed uniformly for the abnormality of the microcomputer, a function of the automatic driving system stops.

However, if the function of the automatic driving system suddenly stops, a vehicle occupant needs to take over the driving, but control interpolation by a vehicle system is required since it takes time for the vehicle occupant to take over the driving, and a technique for such control interpolation is required.

As means for solving the above-described problem, PTL 1 describes the control when the power supply voltage of the microcomputer falls outside the proper range in the state where the microcomputer normally operates, but it is necessary to take into consideration an operation abnormality of the microcomputer itself due to factors such as microcomputer overload, and it is difficult to avoid resetting the microcomputer.

In addition, when the microcomputer of the ECU that controls a plurality of driving power sources becomes abnormal, it is conceivable to appropriately notify the ECU that controls the driving source of such an abnormality, perform idling traveling, emergency stop, or the like to prevent occurrence of an abnormality in a driving force.

However, even if the microcomputer abnormality is notified to the ECU that controls the external driving motive power source when the microcomputer abnormality occurs, there is a concern that appropriate control transition may be impossible due to the size of the control scale depending on external situations of a host vehicle.

Therefore, it is possible to consider a method of performing control transition from a control microcomputer to a degeneration control microcomputer when an abnormality is detected in an operation of the control microcomputer that controls an operation of an automatic driving system.

However, it is difficult to avoid a control transition time, that is, a control blank section, for the degeneration control microcomputer to switch control after receiving the abnormality notification, and such a control transition risk is involved.

In addition, there is a problem that the control transition risk differs depending on the relationship with objects around the host vehicle.

The present invention has been made in view of the above problems, and an object thereof is to implement a vehicle control device and an electronic control system capable of performing control transition safely to a degeneration control microcomputer even when an operation abnormality occurs in an arithmetic processing unit of a control device, and improving safety.

Solution to Problem

In order to achieve the above object, the present invention is configured as follows.

A vehicle control system includes: a first control command generation unit that generates a first control command for a vehicle drive device; a second control command generation unit that generates a second control command for the vehicle drive device; and a monitoring circuit including: a monitoring unit that monitors an operation of the first control command generation unit; an abnormality notification signal generation unit that outputs an abnormality notification signal to the second control command generation unit when the monitoring unit detects an abnormality of the first control command generation unit; and a reset generation unit that outputs a reset signal to reset the first control command generation unit. The reset generation unit outputs the reset signal after a lapse of a required transition time in which the second control command generation unit ends a control transition operation to generate the second control command since the output of the abnormality notification signal from the abnormality notification signal generation unit.

In addition, an electronic control system includes: an actuator control device that drives an actuator of a moving body; a first control command generation unit that outputs a first control command to the actuator control device; a second control command generation unit that outputs a second control command to the actuator control device; a monitoring circuit that monitors an abnormality of the first control command generation unit, and outputs an abnormality notification signal to the second control command generation unit when detecting the abnormality of the first control command generation unit; and a reset generation unit that resets the first control command generation unit. The reset generation unit outputs the reset signal after a lapse of a required transition time in which the second control command generation unit ends a control transition operation to generate the second control command since the output of the abnormality notification signal from the monitoring circuit.

Advantageous Effects of Invention

According to the present invention, it is possible to implement the vehicle control device and the electronic control system capable of eliminating a control blank period by resetting the control microcomputer after the lapse of the required transition period of the degeneration control microcomputer even when the operation abnormality occurs in the control microcomputer in the vehicle control device, and improving the safety.

DESCRIPTION OF EMBODIMENTS

Hereinafter, embodiments of the present invention will be described with reference to accompanying drawings.

Embodiments (Configuration Example of Automatic Driving System)

First, a configuration of an automatic driving system (vehicle control system) to which the present invention is applied will be described.

Figure 1:
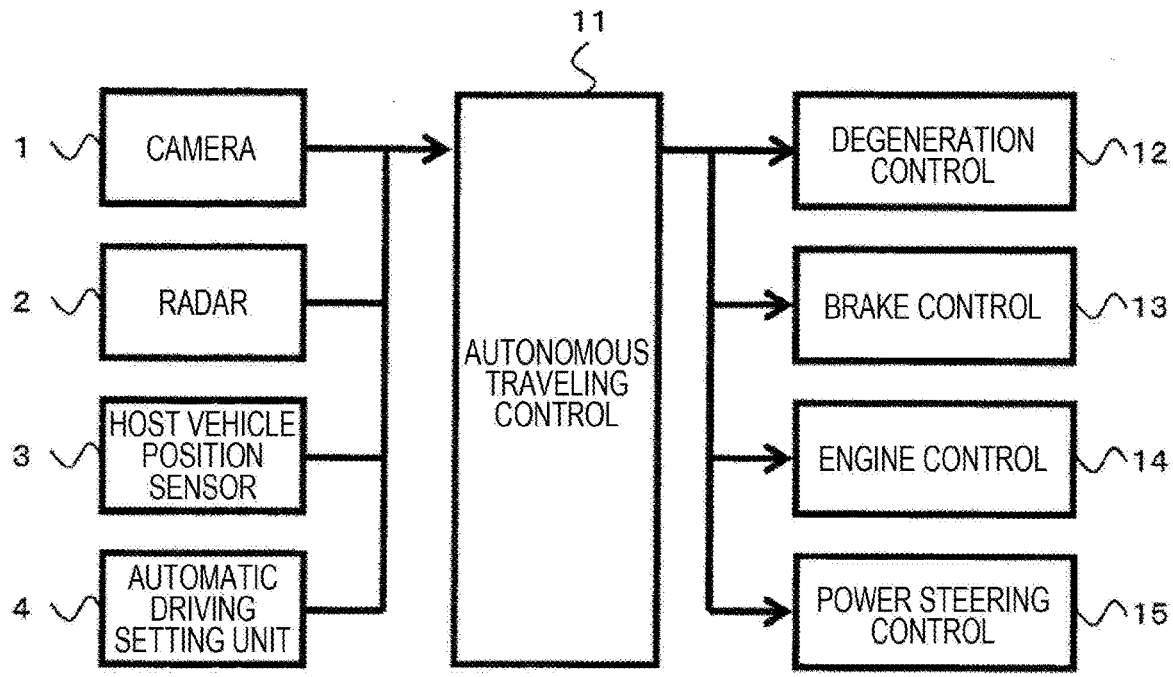
FIG. 1 is a schematic configuration diagram of an automatic driving system provided in a vehicle to which the present invention is applied.

FIG. 1 is a schematic configuration diagram of the automatic driving system provided in a vehicle to which the present invention is applied. In FIG. 1, the automatic driving system includes: a camera (first sensor) 1 which is an external recognition sensor configured to recognize an external situation of the vehicle; a radar (second sensor) 2; a host vehicle position sensor (third sensor) 3; and an automatic driving setting unit 4 configured to set automatic driving.

The automatic driving system further includes an autonomous traveling control unit 11, a degeneration control unit 12, a brake control unit 13, an engine control unit 14, and a power steering control unit 15.

Note that the brake control unit 13, the engine control unit 14, and the power steering control unit 15 can be collectively referred to as an actuator control unit that controls the operation of the vehicle.

The camera 1, the radar 2, the host vehicle position sensor 3, the autonomous traveling control unit 11, the degeneration control unit 12, the brake control unit 13, the engine control unit 14, and the power steering control unit 15 are connected to be capable of communicating with each other via an in-vehicle network (for example, a controller area network (CAN) or Ethernet (registered trademark)).

The degeneration control unit 12 is a control device that operates to execute appropriate degeneration control as a backup when the autonomous traveling control unit 11 fails, but the degeneration control unit 12 is unnecessary if safety can be ensured by providing a degeneration control function in the autonomous traveling control unit 11 even when the autonomous traveling control unit 11 fails.

The brake control unit 13 is a control device that performs vehicle brake control (braking force control), and the engine control unit 14 is a control device that controls an engine that generates a driving force of the vehicle. In addition, the power steering control unit 15 is a control device that controls power steering of the vehicle. Note that the engine has been exemplified as means for generating the driving force, but it is a matter of course that the present invention can be applied to an electric motor.

The host vehicle position sensor 3 is a device that acquires a position of a host vehicle using radio waves from a positioning satellite such as a global positioning system (GPS). The host vehicle position sensor 3 outputs the obtained host vehicle position information to the autonomous traveling control unit 11. Note that the host vehicle position sensor 3 may acquire the host vehicle position information using a positioning system other than the GPS.

In addition, inside the host vehicle position sensor 3, there is a memory for holding map data to be used in the automatic driving, and the map data, such as a road width, the number of lanes, a slope, a curvature of a curve, a shape of an intersection, and speed limit information, is stored. Note that the map data may be stored inside the autonomous traveling control unit 11.

The automatic driving setting unit 4 is a device that sets a destination, a route, a traveling speed, and the like during the automatic driving. The automatic driving setting unit 4 has an input device (not illustrated) configured to allow a passenger to make settings.

Examples of the input device include not only a start switch configured to allow the passenger to start the automatic driving system but also a physical input device such as a button and a touch panel, a gesture input device using a camera or infrared rays, a voice input device, and the like. The automatic driving setting unit 4 outputs information, input via the input device by the passenger, to the automatic traveling control unit 11.

Here, when receiving a request for automatic driving by the automatic driving setting unit 4, the autonomous traveling control unit 11 calculates a trajectory of the vehicle based on external information from the camera 1, the radar 2, the host vehicle position sensor 3, and the like, the autonomous traveling control unit 11 outputs control commands such as brake and a driving force to the brake control unit 13, the engine control unit 14, and the power steering control unit 15 so as to move the vehicle along the above-described route.

The brake control unit 13, the engine control unit 14, and the power steering control unit 15 receive the control command for automatic traveling control from the autonomous traveling control unit 11, and output an operation signal to each control target (actuator).

First Embodiment

A first embodiment will be described with reference to FIGS. 2 and 3.

Figure 2:
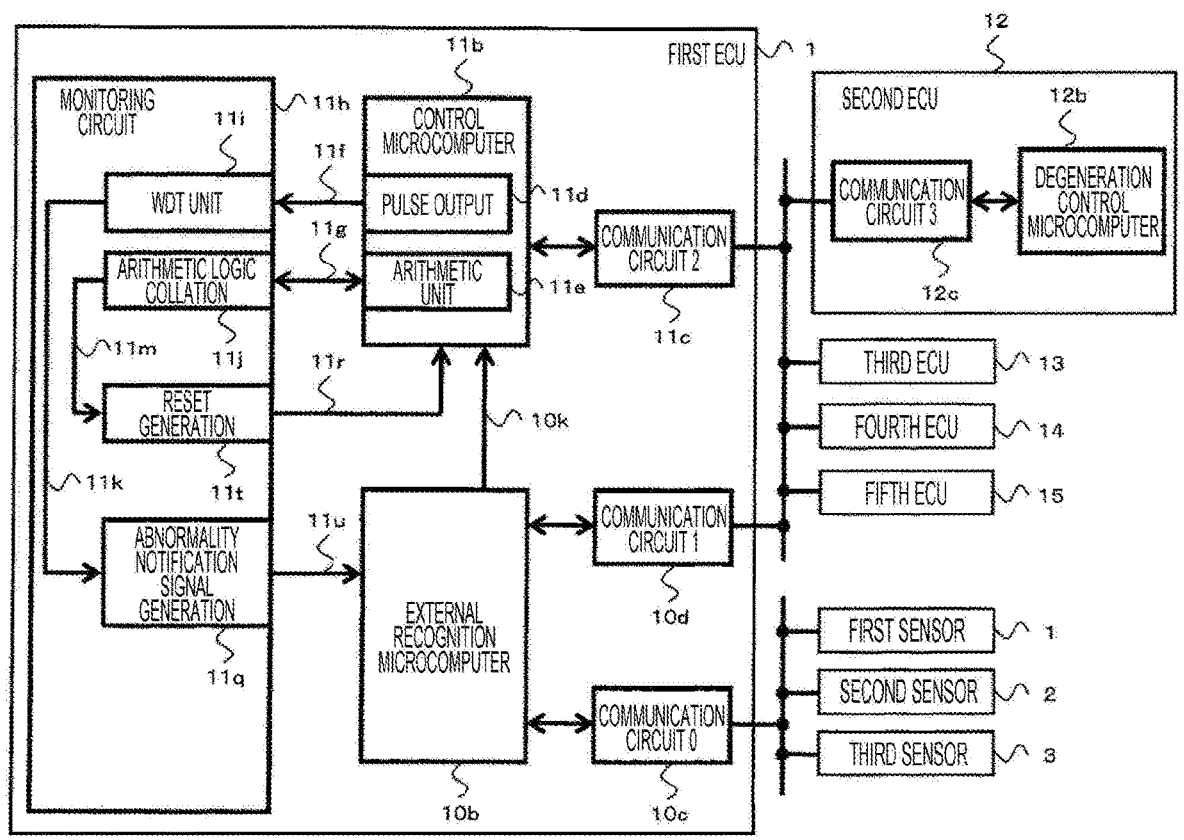
FIG. 2 is a diagram illustrating an internal configuration of an autonomous traveling control unit (first ECU) according to a first embodiment.

As illustrated in FIG. 2, autonomous traveling control is executed by a vehicle control device 11 (also referred to as a first electronic control unit), and degeneration control is executed by a degeneration control device 12 (also referred to as a second electronic control unit) in the present embodiment.

The first electronic control unit 11 includes: a monitoring circuit 11h; an external recognition microcomputer 10b that processes signals from external recognition sensors 1, 2, and 3; and a control microcomputer 11b that generates a travel control command to electronic control units 13, 14, and 15 configured to drive an actuator provided outside based on a signal from the external recognition microcomputer 10b.

The monitoring circuit 11h monitors an operation of the control microcomputer 11b, and resets the control microcomputer 11b when detecting an abnormality. In addition, when being notified of the abnormality of the control microcomputer 11b, the monitoring circuit 11h transmits an abnormality notification signal to the second electronic control unit in order to transition control to the second electronic control unit that transmits the operation command for degeneration to the electronic control units 13 to 15.

The present embodiment illustrates an example in which the control microcomputer 11b is reset after control has transitioned to the degeneration control microcomputer 12b if the monitoring circuit 11h detects the operation abnormality of the control microcomputer 11b.

Here, the control microcomputer 11b is defined as a first control command generation unit that generates a first control command to an external actuator control unit.

The first electronic control unit 11 has two microcomputers, that is, the external recognition microcomputer (an external recognition unit) 10b and the control microcomputer 11b. The external recognition microcomputer 10b includes a communication circuit 10c (communication circuit 0) and a communication circuit 10d (communication circuit 1). In addition, the control microcomputer 11b includes a communication circuit 11c (communication circuit 2).

In addition, when the first electronic control unit (particularly the control microcomputer 11b), which is the autonomous traveling control unit 11 that generates the control command, has failed, the degeneration control unit 12 that operates in place of the autonomous traveling control unit 11 includes the degeneration control microcomputer 12b and the communication circuit 12c (communication circuit 3).

Here, the degeneration control unit 12 is defined as a second control command generation unit that generates a second control command to the external actuator control unit.

In FIG. 2, the autonomous traveling control unit 11 includes the external recognition microcomputer 10b and the control microcomputer 11b, and the degeneration control unit 12 includes the degeneration control microcomputer 12b. However, the external recognition microcomputer 10b, the control microcomputer 11b, and the degeneration control microcomputer 12b may be arranged in the autonomous traveling control unit 11, for example.

In addition, the control microcomputer 11b and the degeneration control microcomputer 12b may be provided in the autonomous traveling control unit 11, and the external recognition microcomputer 10b may be arranged in a control unit other than the autonomous traveling control unit 11.

Sensor information (external recognition information) from the camera 1 (first sensor), the radar 2 (second sensor), and the host vehicle position sensor 3 (third sensor), which are external sensors, are transmitted to the external recognition microcomputer 10b via the communication circuit 10c.

The external recognition microcomputer 10b recognizes an external situation based on the transmitted sensor information, and generates trajectory information on which the host vehicle moves. For this reason, the external recognition microcomputer 10b can be defined as a trajectory information generation unit.

The external recognition microcomputer 10b transmits the generated trajectory information to the control microcomputer 11b via a communication line 10k. The control microcomputer 11b receives pieces of information of external recognitions sensor such as a wheel speed sensor, an acceleration sensor, and a yaw rate sensor (not illustrated) (these pieces of information are also included in the external recognition information) externally from an external ECU (control device) via the communication circuit 11c (communication circuit 2).

The control microcomputer 11b generates actuator control commands based on the information of the external recognition sensor and the trajectory information calculated by the external recognition microcomputer 10b and transmits the generated actuator control commands to the brake control unit 13 (third electronic control unit), the engine control unit 14 (fourth electronic control unit), and the power steering control unit 15 (fifth electronic control unit), respectively.

The monitoring circuit 11h that monitors the control microcomputer 11b is connected to the control microcomputer 11b, and the monitoring circuit 11h includes a first monitoring circuit (first monitoring unit) that detects an abnormality in the control microcomputer 11b in an abnormality detection time T1 (first abnormality detection time) and a second monitoring circuit (second monitoring unit) that detects an abnormality in the control microcomputer 11b in an abnormality detection time T2 (second abnormality detection time) longer than the abnormality detection time T1.

The first monitoring circuit is a watchdog timer 11i (WDT unit) that determines the normality of a program operation of the control microcomputer 11b. A pulse output unit 11d of the control microcomputer 11b outputs a high/low pulse signal 11f having a constant period, and the watchdog timer 11i (WDT unit) determines the normality of the pulse signal 11f.

The second monitoring circuit is an arithmetic logic collation unit 11j that determines the normality of an arithmetic unit 11e of the control microcomputer 11b. By bidirectional communication via a communication line 11g between the monitoring circuit 11h and the control microcomputer 11b, the arithmetic logic collation unit 11j periodically transmits a query signal (for example, a certain random numerical value and an arithmetic expression using the numerical value) to the control microcomputer arithmetic unit 11e, and an answer signal of the control microcomputer arithmetic unit 11e corresponding to the question signal is collated with an expected value calculated in advance by the operation logic comparison unit 11*j*, thereby determining the normality of the control microcomputer 11*b*.

The second monitoring circuit is configured for collation of an arithmetic logic unit, adopts the specification to count up an abnormality counter in the case of collation inconsistency, and can adjust an abnormality detection time by setting a criterion for finally determining the abnormality. In this manner, the abnormality detection time T2 longer than the abnormality detection time T1 is set in advance.

The abnormality detected by the first monitoring circuit is a more serious reset factor (factor to reset the control microcomputer 11*b*) than the abnormality detected by the second monitoring circuit.

The first monitoring circuit and the second monitoring circuit are collectively referred to as a monitoring unit.

Note that the monitoring circuit 11*h* that monitors the control microcomputer 11*b* is a logic circuit, and can be also incorporated in the external recognition microcomputer 10*b*.

Figure 3:
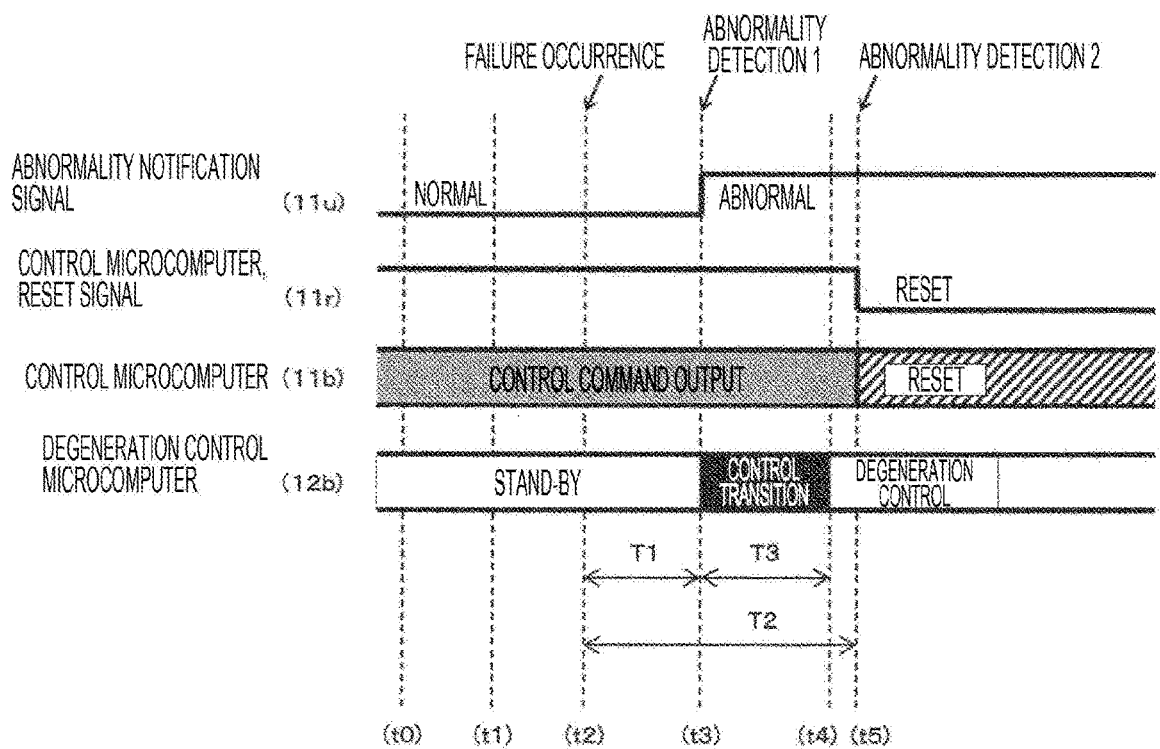
FIG. 3 is a time chart during control transition when a degeneration operation is executed according to the first embodiment.

FIG. 3 is a time chart during control transition to the degeneration control microcomputer 12*b* according to the first embodiment.

In FIG. 3, at timing (t0), the control microcomputer 11*b* outputs a control command to the external actuator control unit, and the degeneration control microcomputer 12*b* is in a standby state.

If a failure occurs in the control microcomputer 11*b* at timing (t2), an abnormality is detected by the first monitoring circuit at timing (t3) after a lapse of the abnormality detection time T1 since the occurrence of the failure, an abnormality notification signal (11*u*) output from an abnormality notification signal generation unit 11*q* becomes high (abnormality detection 1), the degeneration control microcomputer 12*b* is notified of the control microcomputer abnormality, and the control transition is started.

At timing (t4) at which the control transition period (required transition period) T3 has elapsed, the transition preparation of the degeneration control microcomputer 12*b* is completed. At timing (t5) after a lapse of the abnormality detection time T2 since the occurrence of the failure, the abnormality is detected by the second monitoring circuit, the reset signal 11*r* from the reset generation unit 11*t* becomes low, and the control microcomputer 11*b* is reset.

Here, the abnormality detection time T2 from the failure occurrence timing (t2) to the timing (t5) at which the control microcomputer 11*b* is reset is set so as to come after the timing (t4) at which the control transition preparation of the degeneration control microcomputer 12*b* is completed. That is, the above abnormality detection time T2 is set to have the relationship of T2≥T1+T3 (the time obtained by adding T1 and T3 is equal to or less than T2) using the abnormality detection time T1 and the control transition period T3 of the degeneration control microcomputer 12*b*.

Note that, when the failure occurring at the timing (t2) (abnormality of the pulse output unit 11*d*) is a transient failure, there is a case where it is not determined as the abnormality by the second monitoring unit determining the abnormality at a deeper level (whether or not the arithmetic unit 11*e* is abnormal) even if it has been determined as the abnormality by the first monitoring unit. In such a case, the control microcomputer 11*b* is not reset at the timing (t5), but continues the control.

For example, there is a case where it is determined that no abnormality has occurred in the arithmetic unit 11*e* even if it is determined that an abnormality has occurred in the pulse output unit 11*d* due to noise. In such a case, the control microcomputer 11*b* is not reset by the reset signal 11*r* from the reset generation unit 11*t*, and the control by the control microcomputer 11*b* is continued.

As the pulse output unit 11*d* determines that the abnormality has occurred due to the noise, the degeneration control microcomputer 12*b* executes the degeneration control through the control transition operation, so that the degeneration control operation and the control performed by the control microcomputer 11*b* are executed in parallel.

In this case, the brake control unit 3, the engine control unit 14, and the power steering control unit 15 are defined in advance so as to give priority to the control command from the control microcomputer 11*b*. As a result, the control by the control microcomputer 11*b* is continued.

As described above, according to the first embodiment, the abnormality detection time T2, the abnormality detection time T1, and the control transition period T3 are set to have the relationship of T2≥T1+T3. Thus, if an abnormality is detected by the first monitoring circuit at the time T1 after the occurrence of the vehicle failure, the control transition operation of the degeneration control microcomputer 12*b* is started, and the degeneration control operation by the degeneration control microcomputer 12*b* is started after the lapse of the control transition time T3.

Thereafter, when an abnormality is detected by the second monitoring circuit at the time T2 after the occurrence of the vehicle failure, the control microcomputer 11*b* is reset.

In the present embodiment, when the abnormality is detected by the first monitoring circuit, the first electronic control unit issues the control transition command to the second electronic control unit, and the reset is performed according to a result of the second monitoring circuit after the completion of the transition preparation of the second electronic control unit rather than performing the reset immediately. Therefore, the reset of the control microcomputer 11*b* before the start of the degeneration control operation of the degeneration control microcomputer 12*b* is avoided, and a control blank period is eliminated, and it is possible to implement the vehicle control device capable of improving the reliability of a control circuit and the safety of the vehicle. In addition, it is possible to prevent the immediate reset with a primary abnormal value such as noise.

Second Embodiment

Next, a second embodiment will be described with reference to FIG. 4.

A difference from the first embodiment is that the autonomous traveling control unit 11 and the degeneration control unit 12 are provided in the same electronic control unit (ECU).

Figure 4:
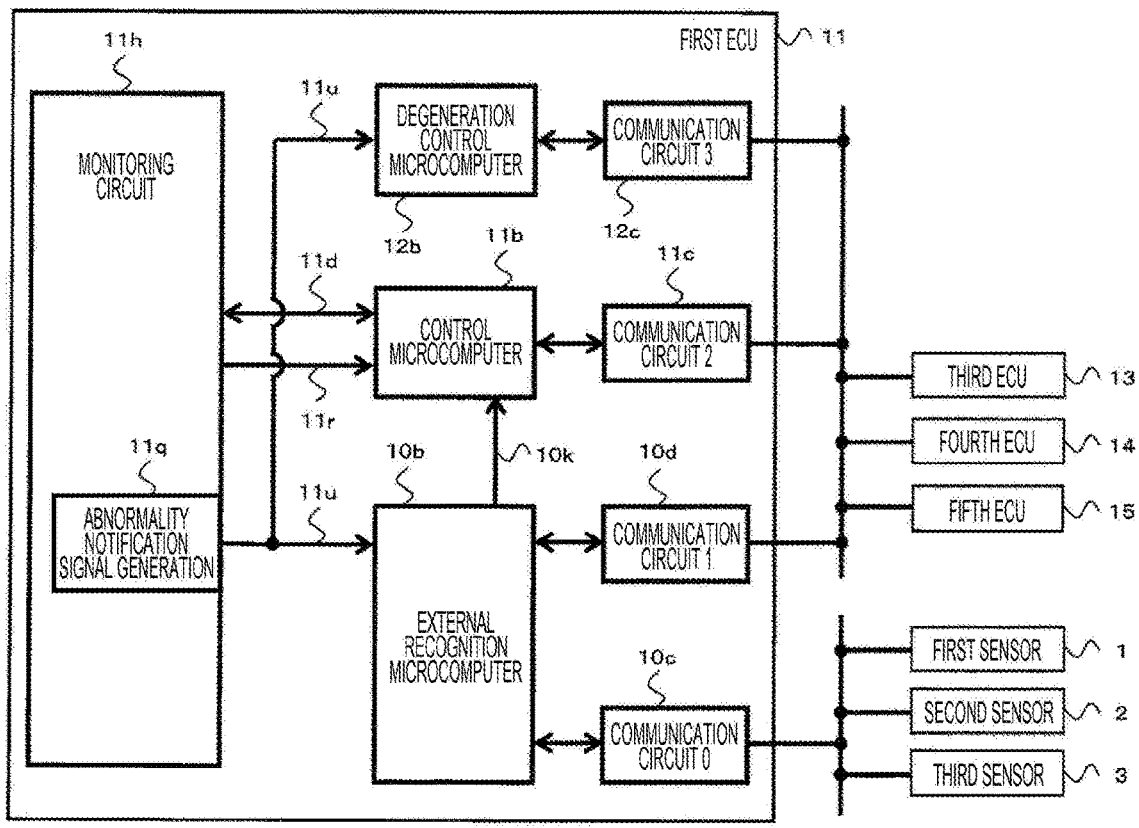
FIG. 4 is a diagram illustrating an internal configuration of an autonomous traveling control unit (first ECU) according to a second embodiment.

As illustrated in FIG. 4, the autonomous traveling control unit (electronic control unit) 11 includes the degeneration control microcomputer 12*b* in addition to the external recognition microcomputer 10*b* and the control microcomputer 11*b*.

The degeneration control microcomputer 12*b* and the communication circuit 12*c* (communication circuit 3) are arranged in the automatic traveling control unit 11. The second embodiment is substantially the same as the first embodiment and also includes the reset generation unit 11*t*, but the abnormality notification signal 11*u* output from the abnormality notification signal generation unit 11*q* is supplied to the external recognition microcomputer 10*b* and the degeneration control microcomputer 12*b* inside the autonomous traveling control unit 11.

In the second embodiment, the same effects as those of the first embodiment can be obtained, and further, there is an effect that the latency when an abnormality occurs is improved since the connection of the signal line of the abnormality detection signal 11u is facilitated.

Third Embodiment

Next, a third embodiment will be described with reference to FIG. 5.

The third embodiment is an example in which the internal configuration of the autonomous traveling control unit (first ECU) 11 is the same as that of the first or second embodiment, but the abnormality detection time T1 and the abnormality detection time T2 can be changed by the monitoring circuit 11h.

Figure 5:
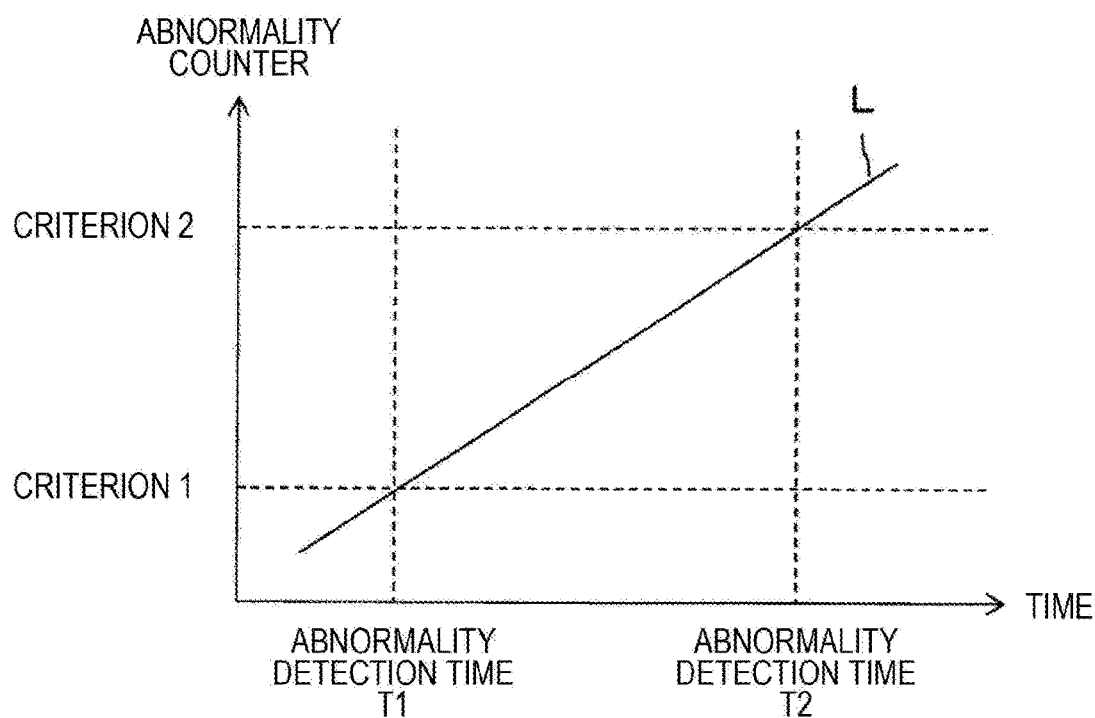
FIG. 5 is an explanatory view of abnormality detection criterion and detection time according to a third embodiment of the present invention.

FIG. 5 is an explanatory view of abnormality detection criterion and detection time according to the third embodiment.

In FIG. 5, the horizontal axis represents an elapsed time from failure occurrence in the control microcomputer 11b, and the vertical axis represents an abnormality counter.

In the example illustrated in FIG. 5, a straight line L in which the abnormality counter increases along with a lapse of time is defined in advance, criterion 1 (determination criterion 1) and criterion 2 (determination criterion 2) are adjusted, the time at the point where the criterion 1 intersects with the straight line L is set as the abnormality detection time T1, and the time at the point where the criterion 2 intersects with the straight line L is set as the abnormality detection time T2. However, the criterion 2 is larger than the criterion 1.

In this manner, the abnormality detection time T1 and the abnormality detection time T2 can be set by setting the criterion 1 and the criterion 2 for the abnormality determination with respect to an abnormality counter value that is counted up each time an abnormality is detected.

That is, the criterion 1 and the criterion 2 are set based on an abnormality detection count, and the abnormality detection count is set to be larger in the criterion 2 than in the criterion 1. Further, a time difference is set such that the abnormal time detection time T2 is longer than the abnormal detection time T1 by setting the abnormality detection time T1 to correspond to the criterion 1 and setting the abnormality detection time T2 to correspond to the criterion 2.

Since the above abnormality detection time T2 is set to have the relationship of T2≥T1+T3, using the abnormality detection time T1 and the control transition period T3 of the degeneration control microcomputer 12b, it is possible to improve the reliability of the control circuit by eliminating the control blank period caused by resetting the control microcomputer 11b.

The present embodiment provides the abnormality detection times T1 and T2 by changing the criterion using the same abnormality detection method while the first and second embodiments provide the abnormality detection times T1 and T2 by using different abnormality detection methods. Even in the present embodiment, the same effects as those of the first and second embodiments can be obtained, and further, it is possible to set the abnormality detection times T1 and T2 in accordance with a vehicle or the like to which the invention is applied, and to perform appropriate degeneration operation transition control in accordance with the vehicle or the like to which the invention is applied.

Fourth Embodiment

Next, a fourth embodiment will be described with reference to FIG. 6. Note that the same configurations as those of the first to third embodiments will not be described.

The fourth embodiment is an example using two monitoring circuits and logic gates. Note that the degeneration control unit 12 may be provided inside the autonomous traveling control unit 11 or may be provided outside.

Figure 6:
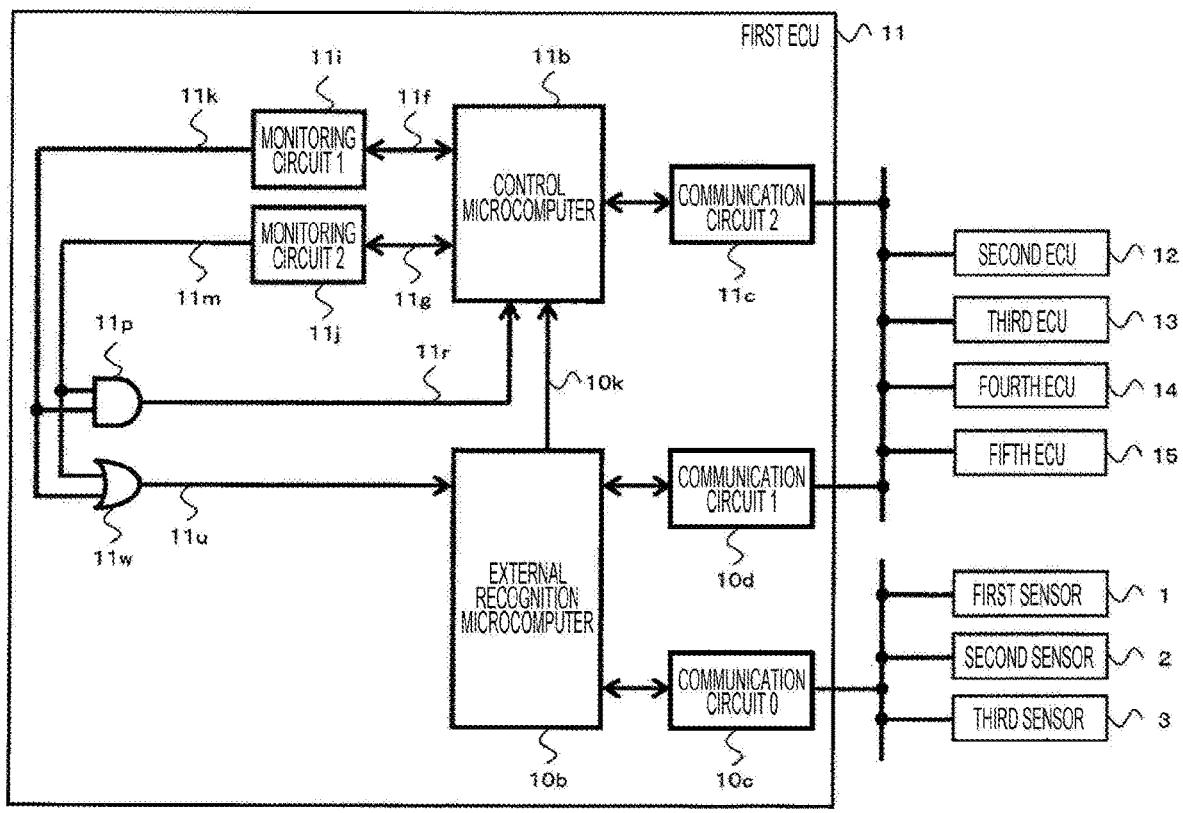
FIG. 6 is a diagram illustrating an internal configuration of an autonomous traveling control unit (first ECU) according to a fourth embodiment of the present invention.

As illustrated in FIG. 6, the first monitoring circuit 11i that monitors the control microcomputer 11b and the second monitoring circuit 11j) are connected to the control microcomputer 11b via an AND gate 11p.

The first monitoring circuit 11i is, for example, a watchdog timer that determines the normality of a program operation of the control microcomputer 11b, and the second monitoring circuit 11j is, for example, an arithmetic logic collation unit that determines the normality of the arithmetic unit 11e of the control microcomputer 11b. Thus, different monitoring units are provided as in the first embodiment. In other words, it includes a first monitoring unit for the abnormality detection time T1 and a second monitoring unit for the abnormality detection time T2 are provided.

Note that the third embodiment may be adopted.

Normality determination results of the first monitoring circuit 11i and the second monitoring circuit 11j are connected, to an input terminal of the AND gate 11p that is a reset generation unit and an input terminal of an OR gate 11w that is an abnormality notification signal generation unit, as a signal 11k and a signal 11m, respectively.

In the present embodiment, the first monitoring circuit 11i, the second monitoring circuit 11j, the AND gate 11p, and the OR gate 11w form the monitoring circuit 11h.

Agate output of the OR gate 11w reacts when an abnormality is detected in any monitoring circuit between the first monitoring circuit 11i and the second monitoring circuit 11j, and the external recognition microcomputer 10b is notified of the abnormality detection signal 11u.

On the other hand, an output of the AND gate 11p reacts when an abnormality is detected by both the monitoring circuits of the monitoring circuit 111i and the monitoring circuit 211j (monitoring circuit 2), thereby enabling more reliable abnormality detection.

Therefore, the gate output of the OR gate 11w and the output of the AND gate 11p react at different timings, and thus, the reset of the control microcomputer can be executed after the completion of the control transition to the degeneration control unit similarly to the first embodiment, so that the generation of the blank period can be suppressed.

As described above, according to the fourth embodiment, the abnormality detection time T1 and the abnormality detection time T2 are generated by diagnosing the control microcomputer 11b with two types of monitoring units similarly to the first embodiment, and it is possible to implement the reset of the control microcomputer 11b after the abnormality notification to the degeneration control microcomputer 12b and the completion of the control transition to the degeneration control microcomputer 12b.

In addition, when a failure of the control microcomputer 11b is a transient failure such as noise, the control is continued without transition, so that the control of the control microcomputer 11b is ensured.

Fifth Embodiment

Next, a fifth embodiment will be described with reference to FIGS. 7 and 8.

The same configurations as those of the first and second embodiments will not be described.

Figure 7:
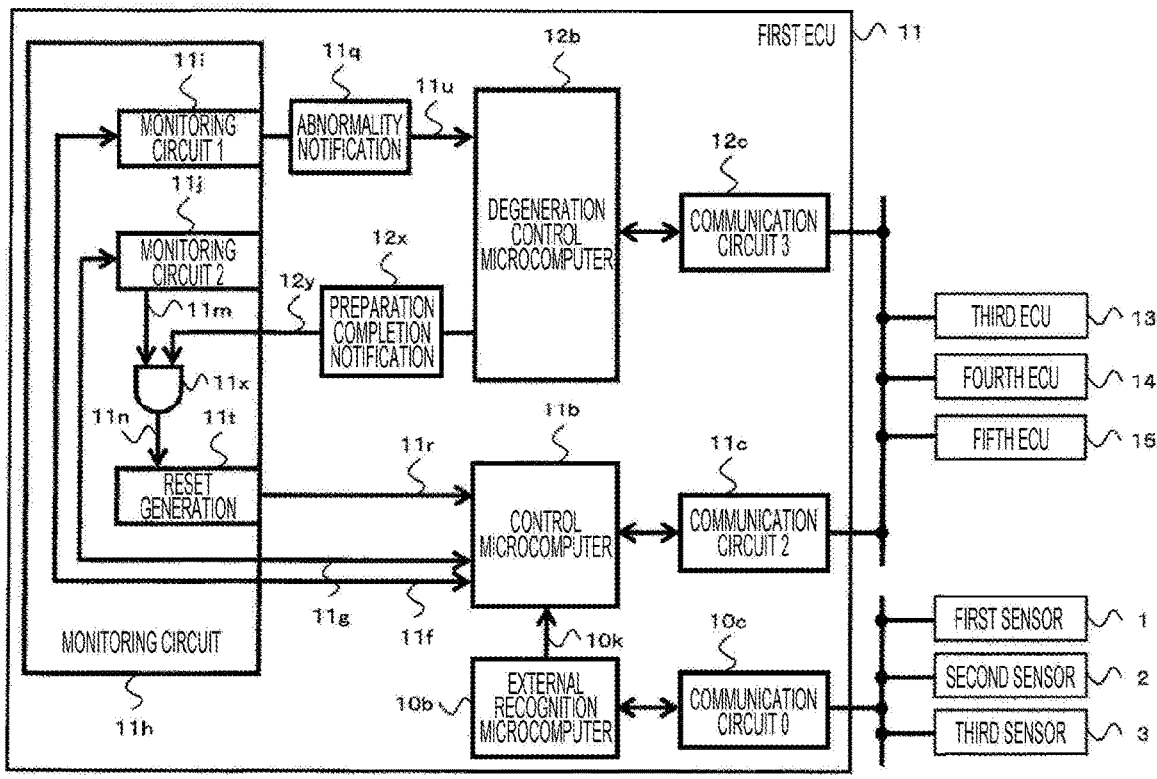
FIG. 7 is a diagram illustrating an internal configuration of an autonomous traveling control unit (first ECU) according to a fifth embodiment of the present invention.

An example illustrated in FIG. 7 is an example in which the control microcomputer 11b is reset after control has transitioned to the degeneration control microcomputer 12b if the monitoring circuit 11*h* detects the operation abnormality of the control microcomputer 11*b*.

This point is the same as that in the first and second embodiments, but the fifth embodiment is an example obtained by further ensuring that the control microcomputer 11*b* is not to be reset unless control has transitioned to the degeneration control microcomputer 12*b*.

As illustrated in FIG. 7, the autonomous traveling control unit 11, which is a traveling control device for automatic driving of the present embodiment, includes three microcomputers, that is, the external recognition microcomputer 10*b*, the control microcomputer 11*b*, and the degeneration control microcomputer 12*b*. The external recognition microcomputer 10*b* includes the communication circuit 10*c* (communication circuit 0), and the control microcomputer 11*b* includes the communication circuit 11*c* (communication circuit 2). In addition, the control microcomputer 12*b* includes the communication circuit 12*c* (communication circuit 3).

As described above, the autonomous traveling control unit 11 includes the external recognition microcomputer 10*b*, the control microcomputer 11*b*, and the degeneration control microcomputer 12*b*. However, for example, the external recognition microcomputer 10*b* and the control microcomputer 11*b* may be arranged in a first electronic control unit that is the autonomous traveling control unit 11, and the degeneration control microcomputer 12*b* may be arranged in a second electronic control unit.

In addition, the control microcomputer 11*b* and the degeneration control microcomputer 12*b* may be arranged in the autonomous traveling control unit 11, and the external recognition microcomputer 10*b* may be arranged in a control unit other than the autonomous traveling control unit 11.

Sensor information (external recognition information) from the camera 1 (first sensor), the radar 2 (second sensor), and the host vehicle position sensor 3 (third sensor), which are external sensors, are transmitted to the external recognition microcomputer 10*b* via the communication circuit 10*c*. The external recognition microcomputer 10*b* recognizes an external situation based on the transmitted sensor information, and generates trajectory information on which the host vehicle moves.

The external recognition microcomputer 10*b* transmits the generated trajectory information to the control microcomputer 11*b* via a communication line 10*k*. The control microcomputer 11*b* receives pieces of information of external recognitions sensor such as a wheel speed sensor, an acceleration sensor, and a yaw rate sensor (not illustrated) (these pieces of information are also included in the external recognition information) externally from an external ECU (control device) via the communication circuit 11*c* (communication circuit 2).

The control microcomputer 11*b*, based on the information of the external recognition sensor and the trajectory information calculated by the external recognition microcomputer 10*b*, an actuator control command is generated and transmitted to the brake control unit 13 (third ECU), the engine control unit 14 (fourth ECU), and the power steering control unit 15 (fifth ECU).

The monitoring circuit 11*h* that monitors the control microcomputer 11*b* is connected to the control microcomputer 11*b*, and the monitoring circuit 11*h* includes the first monitoring circuit 11*i* that detects the abnormality in the control microcomputer 11*b* in an abnormality detection time T1 and the second monitoring circuit 11*j* that detects an abnormality in the control microcomputer 11*b* in the abnormality detection time T2 longer than the abnormality detection time T1.

In addition, the above first monitoring circuit 11*i* and the above second monitoring circuit 11*j* are connected to the control microcomputer 11*b* by the communication line 11*f* and the communication line 11*g*, respectively, and monitor the control microcomputer 11*b* by transmitting and receiving signals on the communication lines 11*f* and 11*g*.

The first monitoring circuit 11*i* may be, for example, a watchdog timer as in the first embodiment. Meanwhile, the second monitoring circuit 11*j* is desired to perform a highly robust diagnosis in order to reset the control microcomputer 11*b* based on the monitoring result, and may adopt a system, for example, that collates the arithmetic logic similarly to the first embodiment.

The first monitoring circuit 11*i* and the second monitoring circuit 11*j* set the abnormality detection time T2 longer than the abnormality detection time T1, for example, by adjusting diagnostic criteria, respectively.

When the first monitoring circuit 11*i* detects an abnormality in the control microcomputer 11*b*, the abnormality notification signal 11*u* is input to the degeneration control microcomputer 12*b* via the abnormality notification output circuit 11*q*, and the degeneration control microcomputer 12*b* transitions to the degeneration control.

On the other hand, when the abnormality of the control microcomputer 11*b* is detected by the second monitoring circuit 11*j*, the abnormality signal 11*m* is input to one input terminal of the AND gate 11*x* in the monitoring circuit 11*h*.

After the abnormality notification signal 11*u* is input and the control transition is ended after the start of the transition to the degeneration control, the degeneration control microcomputer 12*b* outputs a transition preparation completion signal 12*y* to the other input terminal of the AND gate 11*x* in the monitoring circuit 11*h* via a preparation completion notification output circuit 12*x* (control transition operation end detection unit).

That is, the preparation completion notification output circuit 12*x* detects that the control transition has been ended (completed) after the degeneration control microcomputer 12*b* starts transitioning to the degeneration control, and outputs the transition preparation completion signal 12*y* to the other input terminal of the AND gate 11*x*.

With the above operation, when the abnormality occurs in the control microcomputer 11*b*, the degeneration control microcomputer 12*b* completes the control transition upon receiving the abnormality notification 11*u* of the first monitoring circuit 11*i*, and the second monitoring circuit 11*j* detects the abnormality, both the input terminals of the AND gate 11*x* become high, and the output signal 11*n* of the AND gate 11*x* becomes high.

When the output signal 11*n* of the AND gate 11*x* becomes high, the reset generation unit 11*t* outputs the reset signal 11*r* to the control microcomputer 11*b* to reset the control microcomputer 11*b*.

Figure 8:
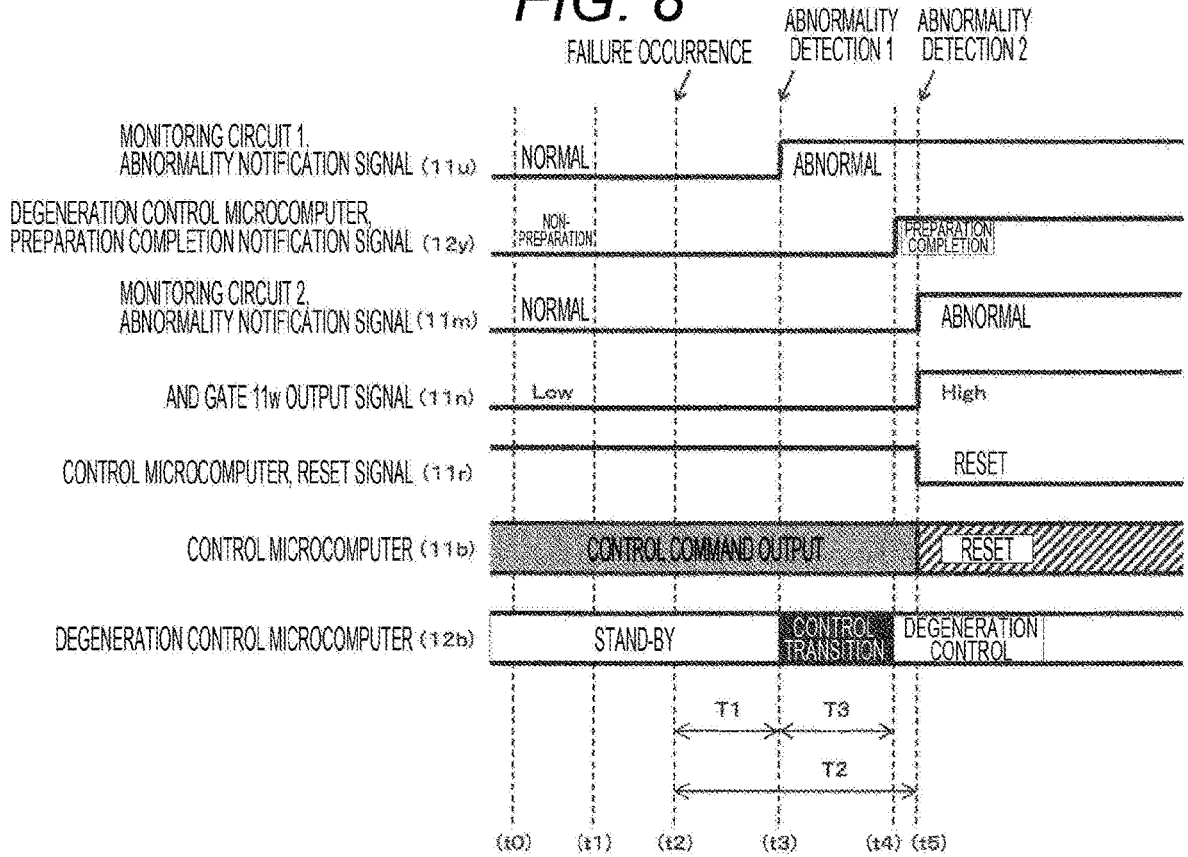
FIG. 8 is a time chart during control transition when a degeneration operation is executed according to the fifth embodiment of the present invention.

FIG. 8 is an operation time chart during the control transition to the degeneration control microcomputer 12*b* according to the fifth embodiment.

In FIG. 8, at timing (t0), the control microcomputer 11*b* outputs a control command to the external actuator control unit, and the degeneration control microcomputer 12*b* is in a standby state.

If a failure occurs in the control microcomputer 11*b* at timing (t2), the abnormality notification signal 11*u* from the first monitoring circuit 11*i* becomes high at timing (t3) after a lapse of the abnormality detection time T1 since the occurrence of the failure, the degeneration control microcomputer 12b is notified of the control microcomputer abnormality, and the control transition is started.

When the transition preparation of the degeneration control microcomputer 12b is completed at timing (t4) after the lapse of the control transition period T3 since the start of the control transition, the preparation completion notification signal 12y from the degeneration control microcomputer 12b becomes high.

Meanwhile, when the second monitoring circuit 11j detects an abnormality at timing (t5) after the lapse of the abnormality detection time T2 since the occurrence of the failure, the abnormality notification signal 11m becomes high. When both the abnormality notification signal 11m and the preparation completion notification signal 12y become high, the output signal 11n of the AND gate 11w becomes a high output, and the reset signal becomes low, whereby the control microcomputer 11b is reset.

Here, the timing (t5) at which the control microcomputer 11b is reset after the lapse of the above abnormality detection time T2 is set so as to come after the timing (t4) at which the control transition preparation of the degeneration control microcomputer 12b is completed. That is, the above abnormality detection time T2 is set to have the relationship of T2≥T1+T3 using the abnormality detection time T1 and the control transition period T3 of the degeneration control microcomputer 12b.

That is, when the first monitoring circuit 11i has detected the abnormality of the control microcomputer 11b, the abnormality notification signal 11u is output, and the degeneration control microcomputer 12b starts the transition preparation at the early stage. Further, the degeneration control microcomputer 12b completes the control transition, the transition preparation completion signal 12y is input, and the second monitoring circuit 11j determines an abnormality after the completion of the transition preparation by setting the abnormality detection time T2 as described above. Then, the control microcomputer 11b is reset.

Even if the control transition of the degeneration control microcomputer 12b exceeds the control transition period T3 and the abnormality notification signal 11m becomes high first, the control microcomputer 11b is not reset unless the degeneration control microcomputer preparation completion notification signal 12y becomes high.

In the present embodiment, the reset of the control microcomputer 11b can be prevented from being executed before the control transition to the degeneration control unit (degeneration control microcomputer 12b) by taking AND of the signal indicating the completion of the control transition from the degeneration control unit and the abnormality signal from the second monitoring circuit, and thus, the control transition with high safety becomes possible.

Sixth Embodiment

Next, a sixth embodiment will be described.

The above-described example is an example in which the present invention is applied to a car. However, the present invention is not limited to the car, and can be also applied to a motorcycle, a luggage carrier for factories, a traveling robot, and the like as long as it is a moving object.

The sixth embodiment is an example of an electronic control system applicable to various moving objects.

Figure 9:
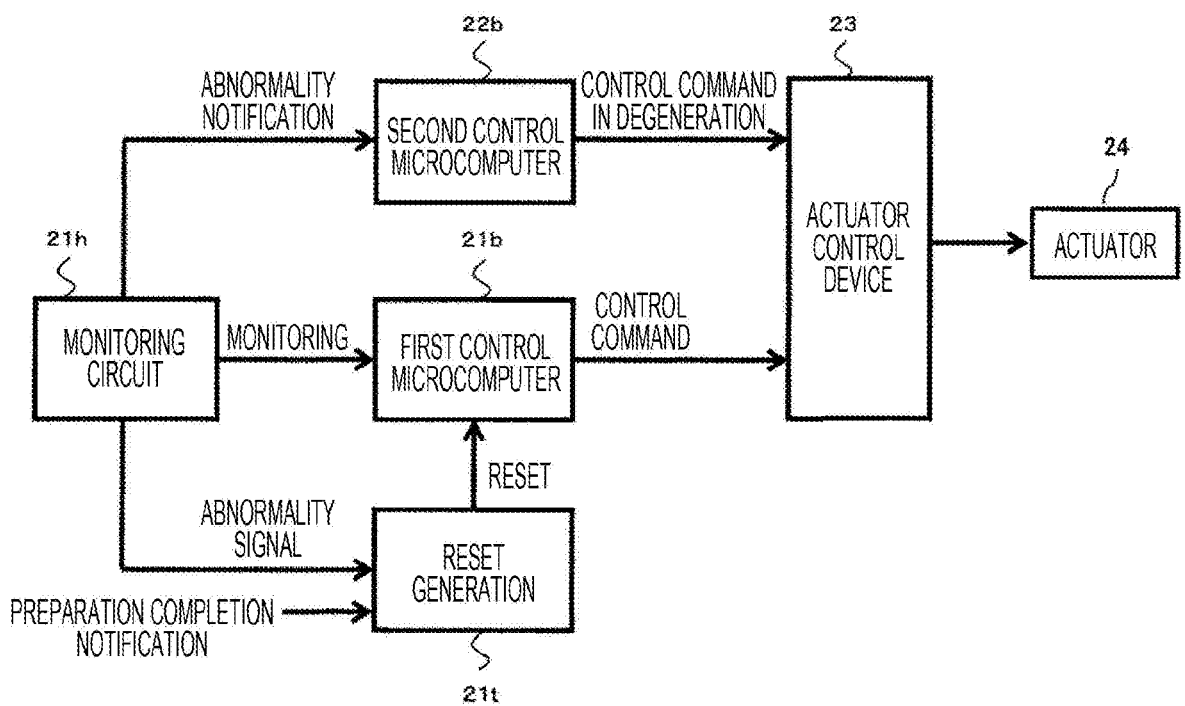
FIG. 9 is a diagram illustrating a configuration of an autonomous traveling control system according to a sixth embodiment of the present invention.

FIG. 9 is a functional block diagram of an operation of the electronic control system (autonomous traveling control system) according to the sixth embodiment.

In FIG. 9, the electronic control system includes: an actuator control device 23 that drives an actuator (drive device) 24 provided in a moving body such as a vehicle; a first control microcomputer (control command generation unit) 21b that outputs a first control command to the actuator control device 23; a second control microcomputer (control command generation unit (degeneration control unit)) 22b that outputs a degeneration control command, which is a second control command, to the actuator control device 23; a monitoring circuit 21h that monitors an abnormality of the first control microcomputer 21b; and a reset generation unit 21t that resets the first control microcomputer 21b.

The monitoring circuit 21h includes a first monitoring circuit and a second monitoring circuit which are similar to those of the first embodiment.

When detecting an abnormality of the first control microcomputer 21b, the first monitoring circuit of the monitoring circuit 21h outputs an abnormality notification signal to the second control microcomputer 22b. When receiving the abnormality notification signal from the monitoring circuit 21h, the second control microcomputer 22b starts transitioning to degeneration operation control.

Then, when the transition to the degeneration operation control is ended (after a required transition period has elapsed), the second control microcomputer 22b outputs a preparation completion notification signal to the reset generation unit 21t, and outputs a degeneration control command to the actuator control device 23.

When detecting the abnormality of the first control microcomputer 21b, the second monitoring circuit of the monitoring circuit 21h outputs an abnormality notification signal to the reset generation unit 21t.

The reset generation unit 21t outputs a reset signal to the first control microcomputer 21b only after both the abnormality signal from the monitoring circuit 21h and the preparation completion notification from the second control microcomputer 22b are achieved. Even if only one of the abnormality signal from the monitoring circuit 21h and the preparation completion notification from the second control microcomputer 22b is input, the reset generation unit 21t does not output the reset signal to the first control microcomputer 21b.

As a result, it is ensured that the first control microcomputer 21b is reset after the end of the control transition operation of the second control microcomputer 22b, and it is possible to transition to the degeneration operation control of the actuator control device 23 without generating the blank period between the control of the actuator control device 23 by the first control microcomputer 21b and the control of the actuator control device 23 by the second control microcomputer 22b.

As described above, even when the abnormality is detected in the first control microcomputer 21b, the control can safely transition to the second control microcomputer 22b without generating the control blank period according to the sixth embodiment of the present invention, so that the control blank period can be eliminated, and the reliability of the control circuit can be improved.

That is, it is possible to implement the electronic control system for the moving object, such as the vehicle, capable of performing the control transition safely to the degeneration control microcomputer even when the operation abnormality occurs in the arithmetic processing unit of the control device, and improving the safety.

In the sixth embodiment, the first control microcomputer 21b and the second control microcomputer 22b can be arranged in the same electronic control unit, or can be also arranged in separate electronic control units.

Note that the above-described examples are configured such that the control and recognition are performed by the microcomputer, such as the control microcomputer 11b, the degeneration control microcomputer 12b, the external recognition microcomputer 10b, the first control microcomputer 21b, and the second control microcomputer 22b, but the present invention is not limited to the microcomputer, may be configured using other logic circuits.

In addition, the control transition operations of the degeneration control microcomputer 12b and the second control microcomputer 22b during the control transition period have not been described in detail in the above-described example, but can be set appropriately for each vehicle to which the invention is applied.

In the above-described embodiments of the present invention, as the control transition operation during the control transition period, the degeneration control microcomputer 12b (the second control microcomputer 22b) can be configured to execute an operation (transfer operation or copy operation) of taking over the control data of the control microcomputer 11b (the first control microcomputer 21b).

Another embodiment of the present invention is a vehicle control method. This vehicle control method is a vehicle control method for executing an automatic driving mode, and includes: a first automatic driving mode of performing automatic driving in a normal state; and a second automatic driving mode of performing degeneration from the first automatic driving mode and detecting whether or not an abnormality has occurred in the first automatic driving mode.

Then, if it is detected that the abnormality has occurred in the first automatic driving mode, preparation for transitioning to the second automatic driving mode is started. During a transition preparation period to the second automatic driving mode, the first automatic driving mode is continued, and the first automatic driving mode is reset after the second automatic driving mode is started since completion of the transition preparation period to the second automatic driving mode.

As a result, even when the abnormality occurs in the first automatic driving mode, it is possible to safely perform the control transition to the second automatic driving mode for degeneration, and thus, it is possible to implement the vehicle control method capable of improving the safety.

REFERENCE SIGNS LIST 1 camera
2 radar
3 host vehicle position sensor
4 automatic driving setting unit
10b external recognition microcomputer
10c, 10d, 11c, 12c communication circuit
10k trajectory information transmission line
11 autonomous traveling control unit
11h monitoring circuit
11i first monitoring circuit (WDT unit)
11j second monitoring circuit 2 (arithmetic logic collation unit)
11q abnormality notification signal generation unit
11r reset signal
11t reset generation unit
11u abnormality notification signal
11p, 11x AND gate
11w OR gate
12 degeneration control unit
12b degeneration control microcomputer
13 brake control unit
14 engine control unit
15 power steering control unit
21b first control microcomputer
21h monitoring circuit
21t reset generation unit
22b second control microcomputer
23 actuator control device
24 actuator

The invention claimed is:

1. A vehicle control device comprising:
a first control command generation unit that generates a first control command for a vehicle drive device;
a second control command generation unit that generates a second control command for the vehicle drive device; and
a monitoring circuit including: a monitoring unit that monitors an operation of the first control command generation unit; an abnormality notification signal generation unit that outputs an abnormality notification signal to the second control command generation unit when the monitoring unit detects an abnormality of the first control command generation unit; and a reset generation unit that outputs a reset signal to reset the first control command generation unit,
wherein the reset generation unit outputs the reset signal after a lapse of a required transition time in which the second control command generation unit ends a control transition operation to generate the second control command since the output of the abnormality notification signal from the abnormality notification signal generation unit.

2. A vehicle control device comprising:
a first control command generation unit that generates a first control command for a vehicle drive device; and
a monitoring circuit including: a monitoring unit that monitors an operation of the first control command generation unit; an abnormality notification signal generation unit that outputs an abnormality notification signal to a second control command generation unit when the monitoring unit detects an abnormality of the first control command generation unit; and a reset generation unit that outputs a reset signal to reset the first control command generation unit,
wherein the reset generation unit outputs the reset signal after a lapse of a required transition time in which the second control command generation unit ends a control transition operation to generate the second control command since the output of the abnormality notification signal from the abnormality notification signal generation unit.

3. The vehicle control device according to claim 1, wherein
the abnormality signal generation unit outputs the abnormality notification signal to the second control command generation unit in a first abnormality detection time after occurrence of an abnormality in the first control command generation unit,
the reset generation unit outputs the reset signal to the first control command generation unit in a second abnormality detection time, longer than the first abnormality detection time, after the occurrence of the abnormality in the first control command generation unit, and
when the first abnormality detection time is T1, the second abnormality detection time is T2, and the required transition time is T3, a time obtained by adding T1 and T3 is equal to or less than T2.

4. The vehicle control device according to claim 3, wherein
a determination criterion 1 set based on an abnormality detection count and a determination criterion 2 which is an abnormality detection count larger than the determination criterion 1 are set, the first abnormality detection time corresponds to the determination criterion 1, the second abnormality detection time corresponds to the determination criterion 2, and a time difference is provided between the first abnormality detection time and the second abnormality detection time.

5. The vehicle control device according to claim 3, wherein
the monitoring unit includes: a first monitoring unit that detects that an abnormality has occurred in the first control command generation unit in the first abnormality detection time after occurrence of an abnormality in the first control command generation unit, and a second monitoring unit that detects that an abnormality has occurred in the first control command generation unit in the second abnormality detection time after the occurrence of the abnormality in the first control command generation unit.

6. The vehicle control device according to claim 5, wherein
the abnormality detected by the first monitoring unit is a more serious reset factor than the abnormality detected by the second monitoring unit.

7. The vehicle control device according to claim 3, wherein
the second control command generation unit further includes a control transition operation end detection unit that detects that the control transition operation has been ended and outputs a transition preparation completion signal to the reset generation unit, and
the reset generation unit outputs the reset signal when the second monitoring unit detects that an abnormality has occurred in the first control command generation unit and the transition preparation completion signal is output from the control transition operation end detection unit.

8. The vehicle control device according to claim 1, wherein
the control transition operation of the second control command generation unit is an operation of transferring control data of the first control command generation unit to the second control command generation unit.

9. An electronic control system comprising:
an actuator control device that drives an actuator of a moving body;
a first control command generation unit that outputs a first control command to the actuator control device;
a second control command generation unit that outputs a second control command to the actuator control device;
a monitoring circuit that monitors an abnormality of the first control command generation unit, and outputs an abnormality notification signal to the second control command generation unit when detecting the abnormality of the first control command generation unit; and
a reset generation unit that resets the first control command generation unit,
wherein the reset generation unit outputs the reset signal after a lapse of a required transition time in which the second control command generation unit ends a control transition operation to generate the second control command since the output of the abnormality notification signal from the monitoring circuit.

10. The electronic control system according to claim 9, wherein
the first control command generation unit and the second control command generation unit are arranged in one electronic control unit.

11. The electronic control system according to claim 9, wherein
the first control command generation unit and the second control command generation unit are arranged in separate electronic control units, respectively.

* * * * *